United States Patent
Kleinrichert

(10) Patent No.: US 11,897,748 B2
(45) Date of Patent: Feb. 13, 2024

(54) CHILLED N2 INFUSED BEVERAGE DISPENSING SYSTEM TO PREPARE AND DISPENSE A CHILLED N2 INFUSED BEVERAGE

(71) Applicant: Automatic Bar Controls, Inc., Vacaville, CA (US)

(72) Inventor: Charles Kleinrichert, Annapolis, MD (US)

(73) Assignee: Automatic Bar Controls, Inc., Vacaville, CA (US)

( * ) Notice: Subject to any disclaimer, the term of this patent is extended or adjusted under 35 U.S.C. 154(b) by 0 days.

(21) Appl. No.: 17/850,786

(22) Filed: Jun. 27, 2022

(65) Prior Publication Data
US 2022/0324691 A1    Oct. 13, 2022

Related U.S. Application Data

(60) Division of application No. 14/706,191, filed on May 7, 2015, which is a continuation of application No. PCT/US2015/028876, filed on May 1, 2015.
(Continued)

(51) Int. Cl.
*B67D 1/04*    (2006.01)
*A23L 2/54*    (2006.01)
(Continued)

(52) U.S. Cl.
CPC ............. *B67D 1/0406* (2013.01); *A23F 3/00* (2013.01); *A23F 5/00* (2013.01); *A23L 2/54* (2013.01);
(Continued)

(58) Field of Classification Search
CPC .. B67D 1/0058; B67D 1/0066; B67D 1/0077; B67D 1/0406; B67D 1/10; B67D 1/0857;
(Continued)

(56) References Cited

U.S. PATENT DOCUMENTS 4,364,493 A * 12/1982 Raynes ................ B67D 1/1252
                                                  251/364
4,438,147 A *  3/1984 Hedrick, Jr. ............. A23G 1/56
                                                  426/585
(Continued)

FOREIGN PATENT DOCUMENTS

DE    10 2008 012 486 A1    9/2009
DE    10 2010 012 175 A1    9/2011
(Continued)

OTHER PUBLICATIONS

European Search Report dated Apr. 14, 2023 in related European application No. 23150943.1 (18 pages).
(Continued)

*Primary Examiner* — Eric S Stapleton
(74) *Attorney, Agent, or Firm* — Kilpatrick Townsend & Stockton LLP

(57) ABSTRACT

A system and method to prepare and dispense a $N_2$ or $N_2/CO_2$ gas infused chilled beverage is provided. The beverage may be any non-carbonated liquid and in one embodiment the beverage is coffee. The dispensed $N_2$ or $N_2/CO_2$ gas infused chilled coffee has a unique appearance and enhanced flavor and aroma. The system may be provided as a self-contained unit.

21 Claims, 7 Drawing Sheets

Related U.S. Application Data

(60) Provisional application No. 61/993,700, filed on May 15, 2014.

(51) Int. Cl.
  *B67D 1/08* (2006.01)
  *B67D 1/10* (2006.01)
  *A23F 3/00* (2006.01)
  *A23F 5/00* (2006.01)
  *B67D 1/00* (2006.01)

(52) U.S. Cl.
  CPC ......... *B67D 1/0058* (2013.01); *B67D 1/0066* (2013.01); *B67D 1/0857* (2013.01); *B67D 1/10* (2013.01); *A23V 2002/00* (2013.01); *B67D 2001/0092* (2013.01); *B67D 2001/0487* (2013.01)

(58) Field of Classification Search
  CPC .... B67D 2001/0092; B67D 2001/0487; A23F 5/00; A23F 3/00; A23L 2/54; A23V 2002/00
  USPC ....................................................... 99/323.1
  See application file for complete search history.

(56) References Cited

U.S. PATENT DOCUMENTS

| | | | | |
|---|---|---|---|---|
| 4,610,888 A * | 9/1986 | Teng | ............... | B67D 1/1416 222/4 |
| 4,708,827 A | 11/1987 | McMillin | | |
| 4,759,474 A | 7/1988 | Regunathan et al. | | |
| 5,029,733 A * | 7/1991 | Hedderick | ............ | B67D 1/0004 137/170.1 |
| 5,462,759 A * | 10/1995 | Westerbeek | ............ | A23C 11/10 426/477 |
| 5,565,149 A * | 10/1996 | Page | ............... | B67D 1/1252 261/DIG. 7 |
| 5,588,984 A * | 12/1996 | Verini | ............... | B01D 53/22 95/52 |
| 5,826,432 A | 10/1998 | Ledbetter | | |
| 5,980,959 A * | 11/1999 | Frutin | ............... | B67D 1/1411 426/118 |
| 6,024,996 A | 2/2000 | Kaper et al. | | |
| 6,138,995 A * | 10/2000 | Page | ............... | B67D 1/1252 261/DIG. 7 |
| 6,209,855 B1 * | 4/2001 | Glassford | ......... | B01F 23/23124 210/150 |
| 6,235,641 B1 * | 5/2001 | Christenson | ...... | B01F 23/23413 257/E21.309 |
| 6,248,689 B1 * | 6/2001 | Manson | ............. | F01N 3/035 502/328 |
| 6,719,175 B2 * | 4/2004 | Mackenzie | ......... | B67D 1/0004 222/335 |
| 7,104,531 B2 * | 9/2006 | Page | ............... | B67D 1/007 261/DIG. 7 |
| 7,717,294 B2 * | 5/2010 | Bodemann | ........... | B67D 1/0878 222/61 |
| 7,806,299 B2 * | 10/2010 | Wauters | ............... | B67D 1/1405 222/400.8 |
| 8,348,245 B2 * | 1/2013 | Fischer | ............... | B01F 23/232 261/DIG. 7 |
| 8,438,969 B2 * | 5/2013 | Gold | ................. | B01F 23/2362 261/DIG. 7 |
| 8,481,097 B2 * | 7/2013 | Skalski | ................. | B65D 85/804 426/77 |
| 9,623,383 B1 * | 4/2017 | Kleinrichert | ........ | B01F 23/2362 |
| 10,017,373 B2 * | 7/2018 | Kleinrichert | ........ | C01B 21/0438 |
| 11,167,975 B2 * | 11/2021 | Kleinrichert | ......... | B67D 1/0058 |
| 11,427,456 B2 * | 8/2022 | Kleinrichert | ......... | B67D 1/0058 |
| 2005/0112717 A1 * | 5/2005 | Buettner | ............... | C12Q 1/26 514/565 |
| 2006/0112717 A1 | 6/2006 | Walton | | |
| 2006/0185372 A1 | 8/2006 | Conde Hinojosa | | |
| 2010/0133708 A1 | 6/2010 | Fischer | | |
| 2011/0041543 A1 | 2/2011 | Tachibana et al. | | |
| 2013/0196031 A1 * | 8/2013 | Criezis | ............... | A23C 19/082 426/74 |
| 2014/0220207 A1 * | 8/2014 | Page | ............... | B01F 35/7547 426/477 |
| 2015/0329343 A1 * | 11/2015 | Kleinrchert | ............... | A23F 3/00 222/146.6 |
| 2016/0280528 A1 * | 9/2016 | Kleinrichert | ......... | B67D 1/0058 |
| 2017/0233235 A2 * | 8/2017 | Kleinrichert | ......... | B67D 1/0058 222/146.6 |
| 2018/0317524 A1 * | 11/2018 | Jennings, III | ......... | B01F 35/833 |
| 2018/0318777 A1 * | 11/2018 | Hartmann | ......... | B01F 23/23124 |
| 2021/0206617 A1 * | 7/2021 | Maharaj | ................. | B67D 1/10 |

FOREIGN PATENT DOCUMENTS

| | | |
|---|---|---|
| EP | 0 585 159 A1 | 3/1994 |
| EP | 0 745 329 A1 | 12/1996 |
| EP | 1 662 218 A1 | 5/2006 |
| GB | 2 247 225 A | 2/1992 |
| GB | 2 333 282 A | 7/1999 |
| GB | 2 340 415 A | 2/2000 |
| GB | 2 358 145 A | 7/2001 |
| GB | 2 496 010 A | 5/2013 |
| WO | 2004/102091 A1 | 11/2004 |
| WO | 2012/100333 A1 | 8/2012 |
| WO | 2014/045275 A1 | 3/2014 |
| WO | 2015/175244 A2 | 11/2015 |

OTHER PUBLICATIONS

Canadian Office Action dated Dec. 21, 2022 in related Canadian Application No. 2,949,057 (four pages).
First Examination Office Action dated Nov. 8, 2021 in related Australian Patent Application No. 2017249108 (three pages).
Notice of Decision to Grant dated Jul. 28, 2022 in related Korean Patent Application No. 10-2016-7034912 (three pages).
Communication pursuant to Article 94(3) EPC dated Mar. 31, 2022 in related European Patent Application No. 15 792 647.8 (four pages).
Canadian Office Action dated Mar. 2, 2022 in related Canadian Application No. 2,949,057 (four pages).
Non-Final Office Action dated Dec. 7, 2017 in related U.S. Appl. No. 14/706,101 (eight pages).
Non-Final Office Action dated Apr. 2, 2019 in related U.S. Appl. No. 14/706,101 (nine pages).
Non-Final Office Action dated Oct. 3, 2019 in related U.S. Appl. No. 14/706,101 (nine pages).
Non-Final Office Action dated Jun. 11, 2021 in related U.S. Appl. No. 14/706,101 (20 pages).
Final Office Action dated Jun. 20, 2018 in related U.S. Appl. No. 14/706,101 (ten pages).
Final Office Action dated Mar. 30, 2020 in related U.S. Appl. No. 14/706,101 (ten pages).
Notice of Reasons for Rejection dated Feb. 19, 2019 in Japanese Patent Application No. 2017-512637 with English translation (15 pages).
Japanese Office Action dated Jul. 30. 2019 in related Japanese Patent Application No. 2017-512637 (with English translation) (six pages).
European Office Action dated Jan. 20, 2017 in European Patent Application No. 15792647.8 (two pages).
Extended European Search Report dated Feb. 15, 2018 in Patent Application No. 15792647.8 915 (15 pages).
European Office Action dated Aug. 27, 2019, in European Patent Application No. 15 792 647.8, (13 pages).
Anon, BeerBlast Mixed Gas Dispense System for Beverage, 2009, Mixed Gas Dispense System, https://www.southtekssystems.com/beerblast-mixed-gas-dispense-system/.
James, Stephen J. et al., "Chilling and Freezing of Foods," Food Processing: Principles and Applications, Second Edition, Edited by Stephanie Clark, Stephanie Jung and Buddhi Lamsal, pp. 79-105, (Apr. 7, 2014).

(56) References Cited

OTHER PUBLICATIONS

Hanson, Serving Coffee on Tap, CO2 vs. Nitrogen, accessed at https://blog.kegoutlet.com/serving-coffee-on-tap-co2-vs-nitrogen/, May 22, 2013.
European Office Action dated Feb. 7, 2019 in European Patent Application No. 15 792 647.8 (eight pages).
Korean Office Action dated Jul. 29, 2021 in related Korean Patent Application No. 10-2016-7034912, (three pages).
Canadian Office Action dated Jun. 15, 2021 in corresponding Canadian Patent Application No. 2,949,057, (six pages).
European Office Action dated Mar. 6, 2018 in related European Patent Application No. 15792647.8 (one page).
European Office Communication dated May 19, 2020 in related European Patent Application No. EP 15 792 647.8 (eight pages).
First Office Action dated Jun. 5, 2018 in related Chinese Patent Application No. 201580038242.2 flied May 1, 2015 with English translation (35 pages).
Second Office Action dated Mar. 5, 2019 in related Chinese Patent Application No. 201580038242.2 flied May 1, 2015 with English translation (32 pages).
Third Office Action dated Sep. 25, 2019 in Chinese Patent Application No. 201580038242.2 filed May 1, 2015 with English translation, (38 pages).
Communication pursuant to Article 94(3) EPC dated Jul. 15, 2021 in European Patent Application No. 15792647.8, (seven pages).
Final Office Action dated Jan. 11, 2022 in related Korean Patent Application No. 10-2016-7034912, (two pages).
Notice of Allowance dated Apr. 4, 2022 in related U.S. Appl. No. 14/706,101 (twelve pages).
Corrected Notice of Allowability dated Apr. 28, 2022 in related U.S. Appl. No. 14/706,101 (eight pages).
International Search Report (ISR) and Written Opinion of the International Searching Authority dated Sep. 23, 2015 in related International Application No. PCT/US15/28876 (twelve pages).
International Preliminary Report on Patentability dated Nov. 15, 2016 in related International Application No. PCT/US15/28876 (nine pages).

\* cited by examiner

CHILLED N2 INFUSED BEVERAGE DISPENSING SYSTEM TO PREPARE AND DISPENSE A CHILLED N2 INFUSED BEVERAGE

CROSS REFERENCE TO RELATED APPLICATIONS

This application is a divisional of U.S. application Ser. No. 14/706,191, filed May 7, 2015, which is a continuation of PCT/US2015/028876, filed May 1, 2015, which is a non-provisional of U.S. Provisional Application No. 61/993,700, filed May 15, 2014, the disclosures of which are incorporated herein by reference in its entireties.

BACKGROUND OF THE INVENTION

The present invention relates to a dispense system to infuse a chilled beverage with $N_2$ or a mixed gas and then dispense that gas infused chilled beverage into a receiver such as a glass or mug so that the dispensed chilled beverage has a flavor, odor and appearance enhanced by the gas infusion and beverage dispensation process.

The use of $N_2$ gas to store and dispense carbonated beverages such as beer and soda is conventionally known and is described, for example in U.S. Pat. Nos. 6,138,995 and 8,438,969. However, infusion of other non-carbonated beverages such as coffee or tea and provision of that product as a chilled beverage to a consumer from a dispensing unit has not been successfully accomplished to date.

A chilled beverage such as tea or coffee is provided with unique flavor and appearance by $N_2$ infusion and there is a need for a system, preferably a self-contained unit that prepares and dispenses chilled $N_2$ or $N_2/CO_2$ infused beverages both in a commercial utility and in a residential kitchen. In addition to flavor and appearance enhancement of the chilled beverage, the system must also be cost effective and user friendly for utilization and maintenance.

SUMMARY OF THE INVENTION

This and other objects are achieved by the present invention, the first embodiment of which includes a system for dispensing a cooled beverage, comprising: a beverage tank capable of being pressurized; a controlled pressurized supply of pure nitrogen gas or a mixed nitrogen gas such as, for example, a mixture of 25% carbon dioxide and 75% nitrogen; a liquid/gas contactor membrane unit; a diaphragm pump; and a beverage faucet attached downstream to the liquid/gas contactor membrane unit; wherein regulated pressure nitrogen gas or mixed gas is fed via supply lines to the liquid/gas contactor membrane unit, the diaphragm pump and through a secondary regulator to the beverage tank, the diaphragm pump is arranged via transfer lines to transfer beverage from the beverage tank to the liquid/gas contactor membrane, and the gas feed supply line to the liquid/gas contactor membrane unit comprises a check valve preventing liquid flow from the liquid/gas contactor membrane unit into the gas supply line.

In a second embodiment of the present invention, the beverage tank may be replaced with a bag in box liquid container which is not pressurized and therefore the system may be simplified because a secondary regulator and gas supply to the beverage container are not necessary. Thus, the present invention includes a system for dispensing a cooled beverage, comprising: a bag-in-box beverage container; a controlled pressurized supply of a gas comprising at least 50% by weight nitrogen; a liquid/gas contactor membrane unit; a diaphragm pump; and a beverage faucet attached downstream to the liquid/gas contactor membrane unit; wherein regulated pressure nitrogen gas is fed via supply lines to the liquid/gas contactor membrane unit and the diaphragm pump, the diaphragm pump is arranged via transfer lines to transfer beverage from the bag-in-box beverage container to the liquid/gas contactor membrane unit, and the nitrogen feed supply line to the liquid/gas contactor membrane unit comprises a check valve preventing liquid flow from the liquid/gas contactor membrane unit into the pressurized gas supply line.

In a further aspect of the first and second embodiments the system includes a chiller or refrigeration unit that cools at least the beverage tank or bag in box container and preferably cools the beverage tank or bag in box container, liquid/gas contactor membrane unit and the dispense tower.

In another special aspect of the first and second embodiments, the nitrogen gas supply is at least 99.5% $N_2$.

In preferred applications of the first and second embodiments, the system is a self-contained unit which is suitable for utility in a commercial facility such as a restaurant or coffee shop.

In another embodiment, the present invention includes a method for dispensing a chilled liquid from the systems of the first and second embodiments and further aspects thereof. The method comprises: charging a beverage to the beverage tank or bag-in-box container; opening the gas supply regulator on the gas supply to feed $N_2$ or $N_2/CO_2$ mixture to the liquid/gas contactor membrane unit, diaphragm pump and the secondary gas regulator; adjusting the gas regulator to supply $N_2$ or $N_2/CO_2$ mixture at a pressure of from 20 to 70 psi at the liquid/gas contactor membrane unit and diaphragm pump; adjusting the secondary regulator to pressurize the beverage tank to 10-12 psi; pumping the chilled liquid from the beverage tank through the diaphragm pump to the liquid/gas contactor membrane unit; contacting the chilled liquid with $N_2$ or $N_2/CO_2$ mixture in the liquid/gas contactor membrane unit to disperse and/or dissolve the $N_2$ or $N_2/CO_2$ in the liquid to obtain a $N_2$ gas infused liquid; and dispensing the $N_2$ gas infused liquid through the beverage faucet to a receiver. Optionally the beverage may be chilled prior to charging to the beverage tank, may be chilled while in the beverage tank or chilled prior to the charge and chilled in the tank.

When the beverage is in a bag in box container pressurization of the container is not necessary and beverage flow to the liquid/gas contactor membrane is accomplished only via the diaphragm pump.

In one preferred aspect of the method of the present invention the chilled beverage is coffee that is cooled to a temperature of 34 to 37° F. and infused with 20 to 50 ppm $N_2$.

In a further aspect of the embodiments of the present invention, the beverage faucet is a slow pour faucet optionally equipped with a restrictor nozzle or restrictor plate.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Throughout this description all ranges described include all values and sub-ranges therein, unless otherwise specified. Additionally, the indefinite article "a" or "an" carries the meaning of "one or more" throughout the description, unless otherwise specified.

According to the present invention the term "beverage" means any noncarbonated aqueous liquid material that is a homogeneous liquid substantially free of solids having a flavor due to dissolved components.

According to the present invention dispensing of the chilled beverage means opening a faucet of the system to allow the chilled $N_2$ or $N_2/CO_2$ infused beverage to flow from the system into a receiver such as a glass, mug or other drinking container. Throughout the following description the term "gas infused" will be employed to describe either $N_2$ or $N_2/CO_2$ infused beverage. If an embodiment is directed specifically to a $N_2/CO_2$ mixture or specifically to only $N_2$ infusion, the actual gas composition is explicitly disclosed.

Dispensing of the gas infused chilled beverage is an element of the present invention wherein reduction of pressure on the gas infused beverage allows escape of infused gas and results in unique properties which distinguishes the dispensed beverage by enhancement of the beverage's flavor and/or appearance.

Throughout this description, the terms nitrogen, nitrogen gas, $N_2$ and $N_2$ gas are used interchangeably and convey the same meaning unless otherwise specified. The term mixed gas is used to describe a gas mixture containing at least 50% $N_2$ with the remainder being carbon dioxide.

The present inventors have recognized that beverages other than carbonated drinks such as beer and soda may have enhanced flavor and attractive appearance as a result of infusing the beverage with nitrogen or a mixture of nitrogen and carbon dioxide. Upon study of methods to disperse and dissolve nitrogen or a combination of nitrogen and carbon dioxide into a chilled beverage such as coffee, tea or other noncarbonated beverages such as juices and electrolyte drinks, for example, the inventors have designed a dispense system to provide a gas infused chilled beverage in such a way to present the beverage with a unique and appealing flavor and appearance.

In description of the Figures that follow elements common to the schematic system will have the same number designation unless otherwise noted.

Figure 1:
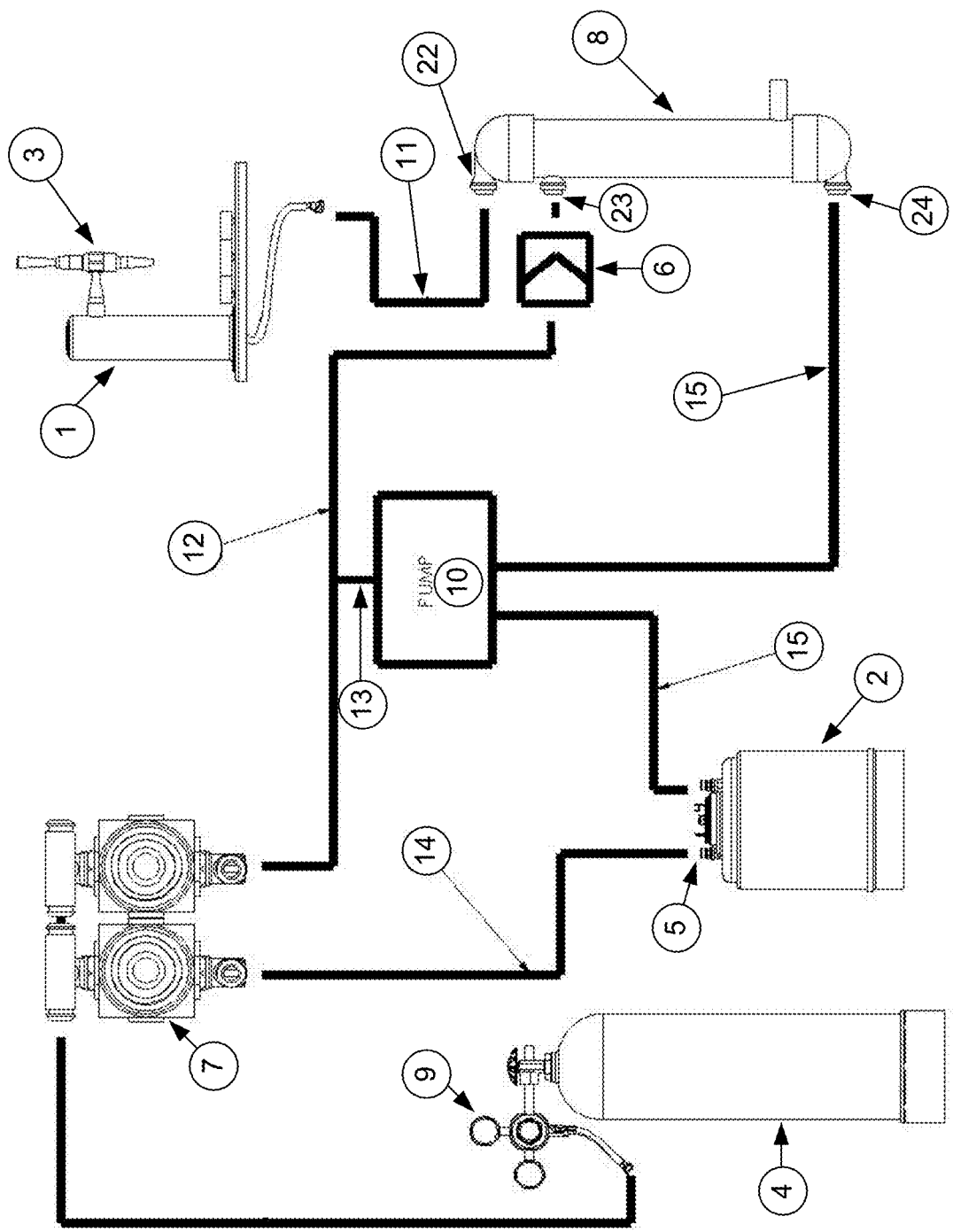
FIG. 1 is a schematic diagram of the system having a beverage tank according to one embodiment of the present invention.

Thus, in a first embodiment as shown schematically in FIG. 1, the present invention provides a system for dispensing a cooled beverage, comprising: a beverage tank capable of being pressurized (2); a controlled pressurized gas supply of pure nitrogen gas or a mixed gas (4); a gas supply assembly (9), a liquid/gas contactor membrane unit (8); a beverage pump (10); and a beverage faucet (3) located in a dispense tower (1) attached downstream in beverage flow to the liquid/gas contactor membrane unit via line (11) wherein regulated pressure gas is fed via supply lines to the liquid/gas contactor membrane unit (12), the beverage pump (13) and through a secondary regulator (7) to the beverage tank (14). The beverage pump is arranged via a transfer line (15) to transfer beverage from the beverage tank to the liquid/gas contactor membrane unit and from the liquid/gas contactor to the tower assembly (11). The gas feed supply line (12) to the liquid/gas contactor membrane unit comprises a check valve (6) preventing liquid flow from the liquid/gas contactor membrane unit via gas inlet (23) into the gas supply line. The chilled beverage is pumped into the liquid/gas contactor via beverage inlet (24) and the gas infused beverage exits the liquid/gas contactor at beverage outlet (22). For convenience and ease of beverage replacement or renewal, the beverage tank may be connected to the gas feed line and the feed line to the pump via quick connect couplings (5) well known in the industry.

The system may preferably incorporate an inline strainer and/or filtration unit (not shown in FIG. (1) in the beverage line from the beverage tank to the pump or in the line from the pump to the liquid/gas contactor membrane unit in order to protect the gas permeable membranes of the liquid/gas contactor membrane unit the filtration from solids which may be present in the beverage.

Figure 2:
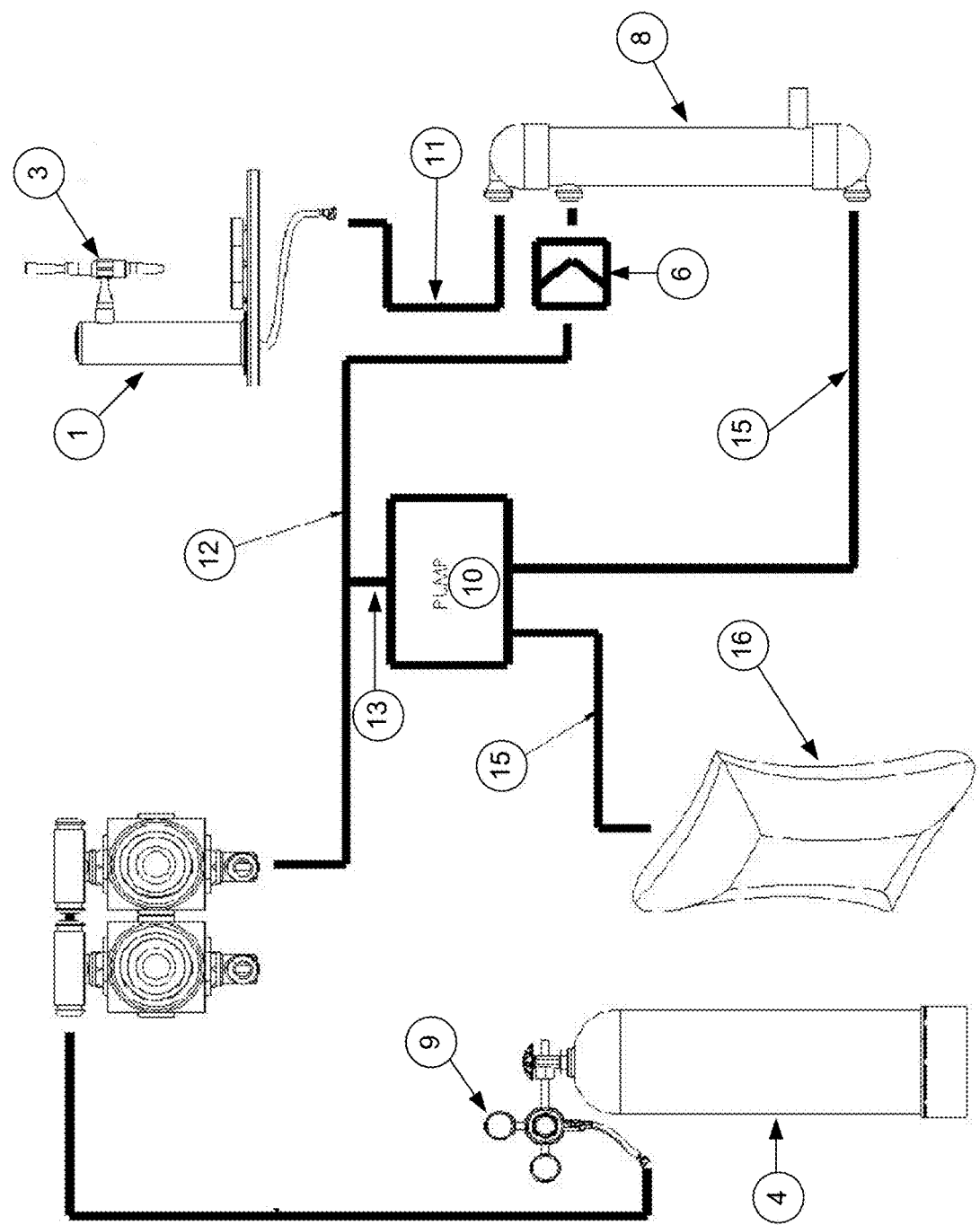
FIG. 2 is a schematic diagram of the system having a bag-in-box beverage container according to one embodiment of the present invention.

In a modification of the first embodiment as shown schematically in FIG. 2, the beverage container capable of being pressurized is replaced with a bag in box beverage container (16). The bag in box modification simplifies the system in that pressurization of the beverage container is not necessary and therefore there is no need for a gas line to the container or secondary gas regulator to control the pressure of that line. The pump (10) transfers the beverage to the liquid/gas contactor membrane unit.

Bag in box containers are commercially available in a range of volume sizes and materials of construction. Any suitable container of volume size convenient to the intended application may be employed. Generally, a container of 1 to 5 gallons is employed based on convenience of handling and size and structure of the refrigeration system to be employed. However, systems constructed for high volume dispense may be larger, for example 10 gallons or more. The box component of the container may be corrugated cardboard while the bag may be constructed of any material accepted for use in the food and beverage industry.

FIGS. 1 and 2 schematically show the arrangement of the fundamental components of the dispense systems of the present invention. However, in the construction of commercial functional units secondary components such as safety regulators, valves, couplings, harnesses, support structure and other functional components known to one of skill in the beverage dispense technology may be incorporated in the system. Such commercial arrangements are included in the present invention as long as the structural components and arrangements disclosed herein are present.

Figure 6:
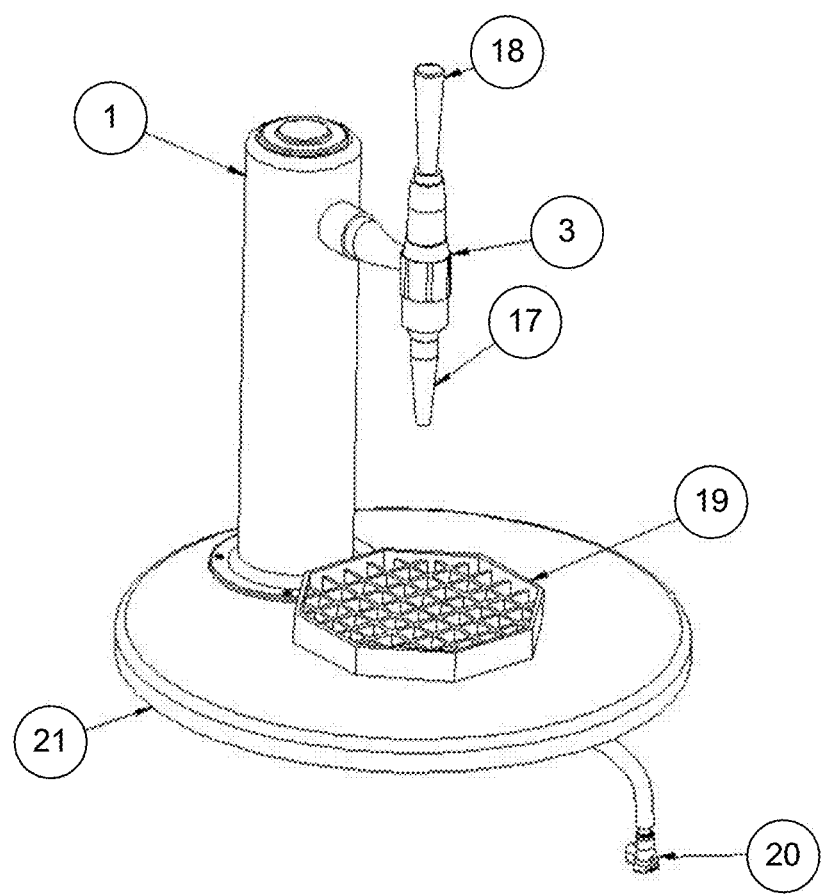
FIG. 6 shows a diagram of a tower assembly according to an embodiment of the present invention.

The faucet (3) shown in FIGS. 1, 2 and 6 may be a slow pour faucet designed to dispense the chilled gas infused liquid at a controlled rate to allow foam formation upon dispense and provide the unique flavor and appearance associated with the product obtained via dispense from the system of this invention. Commercially available faucets typically employed to tap beer are suitable for use as the faucet (3).

FIG. 6 shows a schematic diagram of a faucet tower assembly according to an embodiment of the invention. In a highly preferred aspect of the invention a restrictor nozzle (17) is inserted in the tip of the faucet to further enhance the foam formation during liquid dispense. Restrictor nozzles providing differing dispense characteristics are known and commercially available. Additionally, a restrictor plate may be employed in place of or in combination with the nozzle to enhance the frothing effect of the dispense system. The embodiment shown in FIG. 6 also includes a tap handle (18) which may be a decorative enhancement to the system, a drip tray (19) and quick connect coupling (20) to line (11) shown in FIGS. 1 and 2. The tap handle, drip tray and quick connect coupling are commercial enhancements to the system and are not elements of the present invention.

In preferred embodiments the system is arranged or constituted in a self-contained unit or dispense kit that may be conveniently shipped to and placed in a commercial establishment for preparation and dispensation of specialty gas infused chilled beverages. The system may or may not include a chilling or refrigeration unit capable of cooling the system components and beverage therein to a temperature less than ambient or room temperature. However, if the cooling capability is not included in the system provision to maintain the beverage in a cooled state may be made according to methods known to one of ordinary skill in the art.

Figure 3:
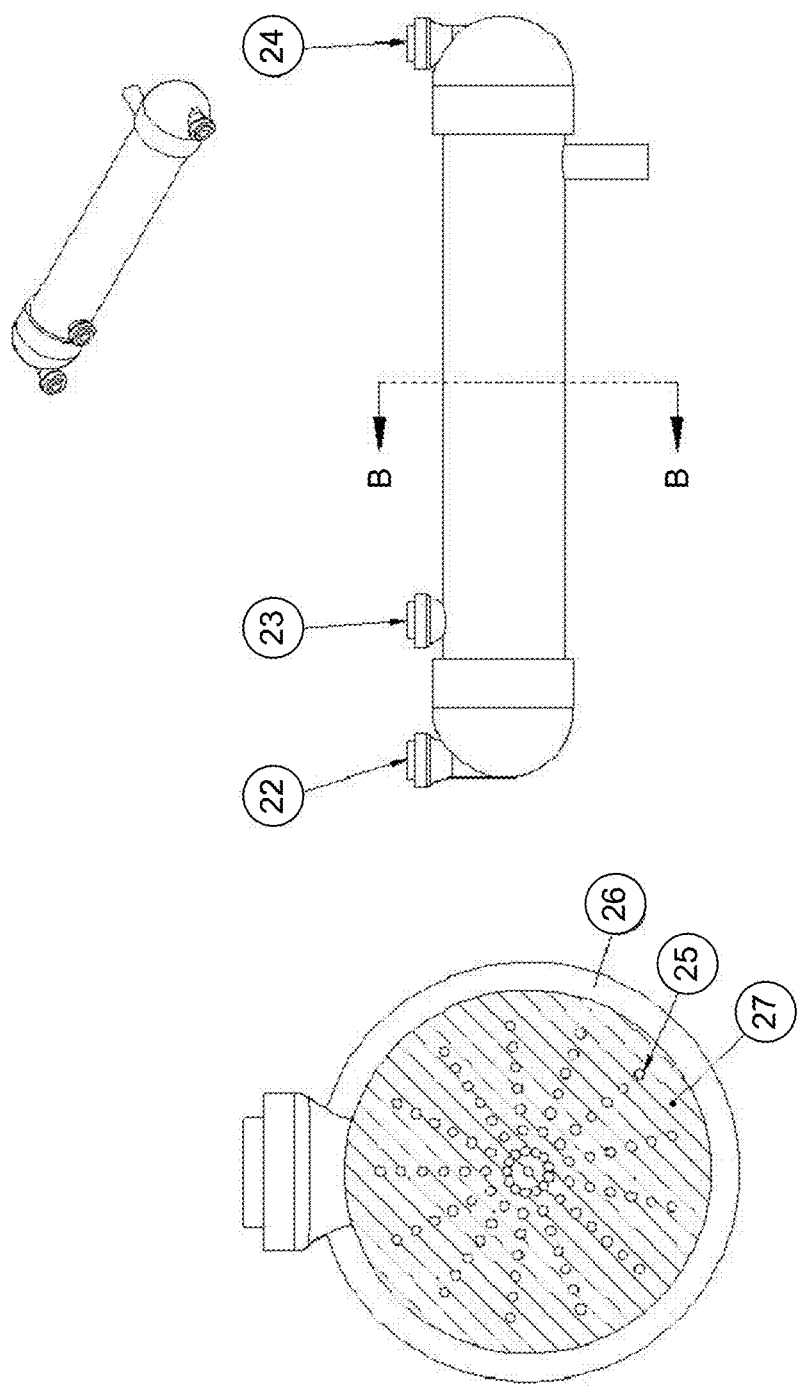
FIG. 3 is a schematic diagram of a liquid/gas contactor membrane unit.

The self-contained unit provides a user friendly and convenient chilled gas infused beverage preparation and dispensing unit especially suited for coffee bars, cafeterias, restaurants and other commercial establishments where beverages are served. In a special embodiment the present invention provides a kit of the above described components that includes a mounting panel housing which attaches to a wall or panel and mounts some or all of the system components to the wall. FIG. 3 shows a schematic diagram of one possible wall mount arrangement of the kit assembly.

The chilling or refrigeration system is capable to cool the system and the beverage therein to approximately 36° F. although the choice of temperature will be dependent upon the beverage being handled in the system and the flavor and appearance sought. Chilling or refrigeration systems suitable for the system of the present invention are commercially available. One particularly preferred system is an IOWA ROTO CAST "BREEZER" cylinder shaped refrigeration unit that may conveniently contain the components of the system.

The beverage tank may be any pressurizable tank constructed of a material suitable for contact with beverages for human consumption. Materials of construction may include stainless steel or a plastic. The volume of the tank is not limited. In preferred embodiments wherein the system is a self-contained unit the volume of the beverage tank may be from 2 quarts to 5 gallons.

The nitrogen supply may be a $N_2/CO_2$ mixture having at least 50% by weight $N_2$ or may be essentially pure nitrogen having a $N_2$ content of at least 99.5% by weight. Grades of nitrogen containing differing content of carbon dioxide within this range may be employed to impart varying flavor and appearance effects to the dispensed beverage.

The nitrogen or mixed gas is supplied via a gas regulator valve through a pressure rated supply line containing a "T" connection to both the liquid/gas contactor membrane unit and the diaphragm pump as indicated in FIG. 1. In this manner the pressure of the chilled beverage pumped into the liquid/gas contactor membrane unit and the pressure of the $N_2$ or $N_2/CO_2$ gas in the liquid/gas contactor membrane unit are controlled by the regulator on the supply tank.

The diaphragm pump may be any appropriately sized diaphragm pump constructed for transfer of liquids for human consumption. Pumps suitable for this use are commercially available and as one example, a "SHURFLO BEER ACE" diaphragm pump may be noted.

The beverage tank is pressurized with $N_2$ or mixed gas that is supplied via a secondary regulator as shown in FIG. 1. Generally, the pressure in the beverage tank is regulated to be lower than the pressure of the $N_2$ or $N_2/CO_2$ mixture supplied to the liquid/gas contactor membrane unit and diaphragm pump.

A check valve is located in the $N_2$ feed line to the liquid/gas contactor membrane unit to prevent liquid "backflow" from the liquid/gas contactor membrane unit to the nitrogen gas supply.

The liquid/gas contactor membrane unit is any suitable membrane unit containing hollow fibers such that $N_2$ or $N_2/CO_2$ mixture gas supplied to the liquid/gas contactor membrane unit contacts the chilled beverage via passage through a gas permeable membrane and is dissolved and/or dispersed into the beverage to form a $N_2$ or $N_2/CO_2$ infused beverage.

In general description, a liquid/gas contactor membrane unit may be constructed of a cylindrical tube containing hollow fiber membranes. Water, aqueous liquid or a liquid having a surface tension similar to water is pumped into the space about the exterior of the hollow membranes. $N_2$ or $N_2/CO_2$ gas at a set pressure as determined by the supply regulator is passed into the interior of the hollow fiber membrane from where it permeates through the membrane and the permeate $N_2$ or $N_2/CO_2$ contacts the chilled beverage on the exterior of the membrane and infuses into the beverage. A schematic diagram of an example of a liquid/gas contactor membrane unit is shown in FIG. 3. As indicated in the cross-sectional view B-B the contactor unit contains a series of hollow fiber membranes (25) arranged within a solid casing (26) and surrounded by fluid space (27). Liquid/gas contactor units are conventionally known and any unit which provides for gas-liquid contact across a permeable membrane may be suitably employed. In one embodiment of FIG. 3, the $N_2$ or $N_2$ mixed gas is passed through the hollow membranes while the chilled beverage is passed through the fluid space surrounding the hollow fiber membranes. However, it is also possible to pass the chilled beverage through the hollow fiber membranes while passing the $N_2$ or $N_2$ mixed gas through the fluid space. Variation and control of the gas pressure in the interior of the hollow fiber membrane relative to the pressure of the liquid on the exterior of the hollow fiber membrane allows for differing degrees of gas infusion into the liquid.

The gas infused beverage is transported from the liquid/gas contactor membrane unit to a dispense tower equipped with a beverage faucet. In a preferred embodiment, as previously described the beverage faucet is a slow pour faucet that dispenses the chilled gas infused beverage at a rate of from 0.1 to 5 ounces per second, preferably from 0.5 to 3 ounces per second and most preferably from 0.8 to 1.2 ounces per second. This effect and dispense rate may be further enhanced by insertion of a restrictor nozzle in the tip of the faucet as previously described.

Figure 4:
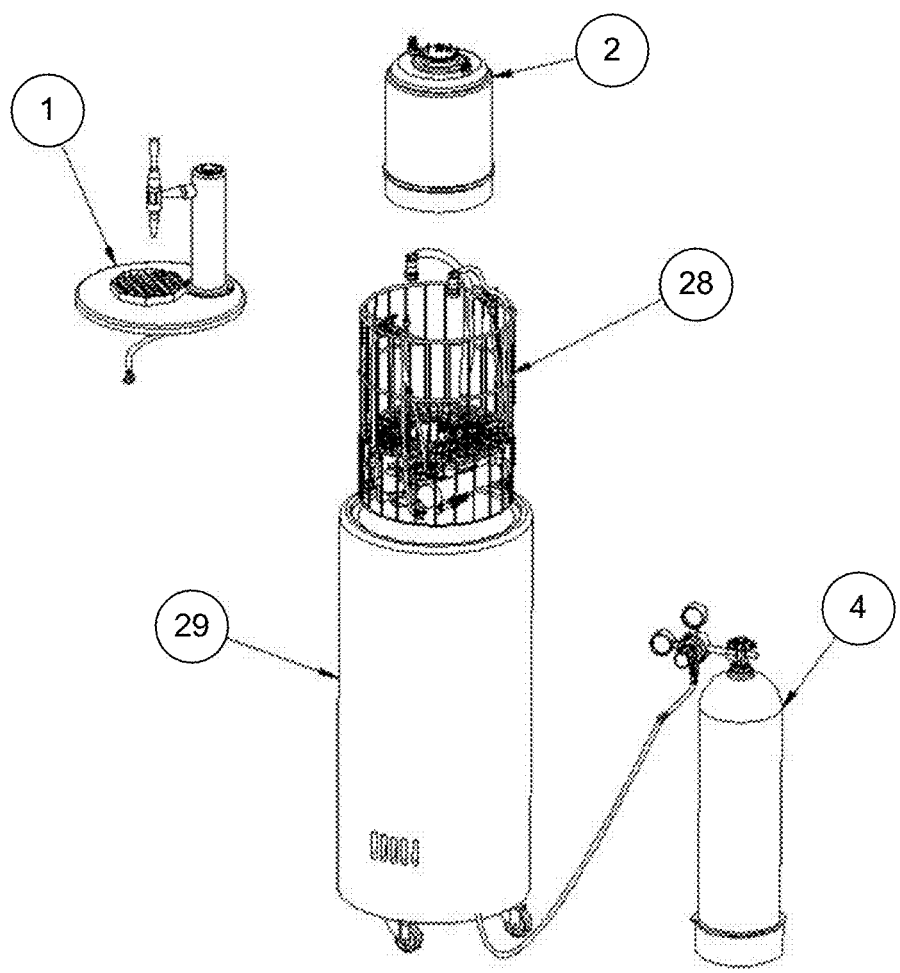
FIG. 4 is a schematic diagram of an arrangement of a portable dispense system kit according to one embodiment of the present invention.
Figure 5:
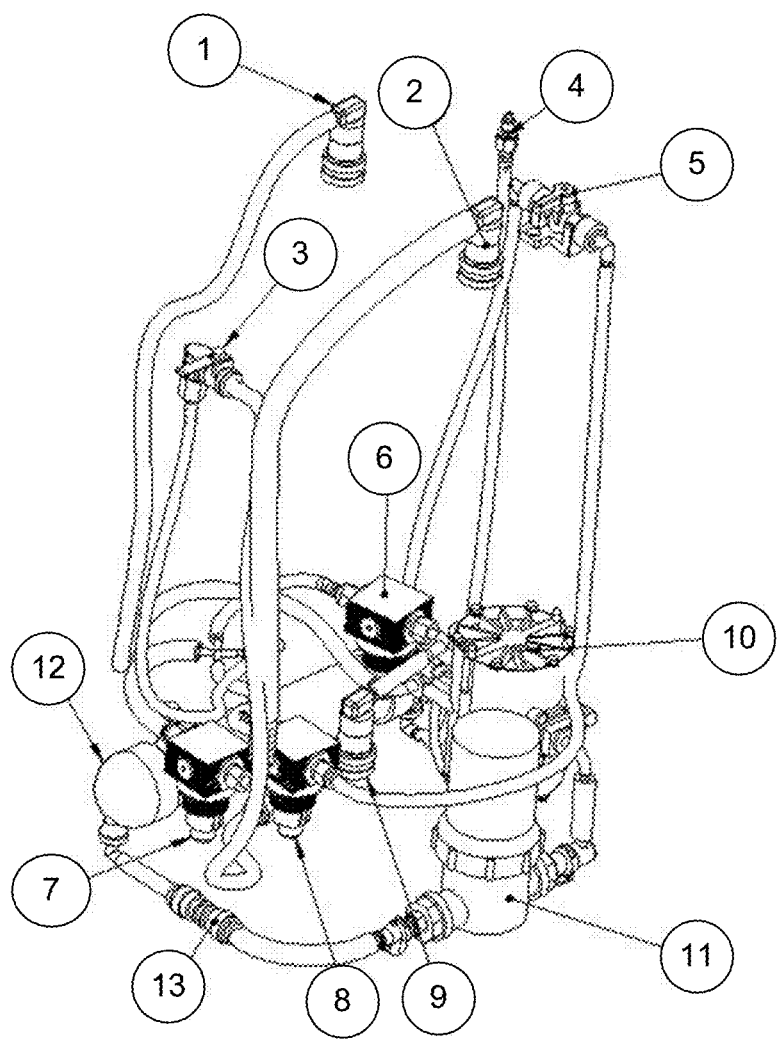
FIG. 5 is a diagram of the components of a basket assembly showing possible optional structural components.

A detailed diagram of an example of a dispense kit assembly arrangement according to the present invention is shown in FIG. 4. In FIG. 4 a beverage container (2) capable of being pressurized is arranged inside a refrigeration body (29). A mixed gas or nitrogen supply tank (4) is located external to the refrigeration unit and supplies pressurized gas into the unit to the nitrogenator infuser (liquid gas contactor membrane unit) (8), the beverage pump (10) and the beverage container (2) via the secondary regulator (7) all arranged in a basket assembly (28) as shown in FIG. 5. This unit may be portable if equipped with wheels or simply free-standing.

The assembly shown in FIG. 5 includes the arrangement shown in FIG. 1 and other secondary components that may be included to enhance the safety and performance of the system as previously described. The component identification numbering for the special embodiment shown in FIG. 5 is not consistent with the numbering in FIGS. 1 and 2 and is identified according to the following key.

(1) liquid quick connect
(2) gas quick connect
(3) clean/purge valve
(4) liquid quick connect to tower assembly
(5) gas control valve to pump
(6) safety gas regulator for liquid/gas contactor
(7) secondary gas regulator
(8) gas regulator to pump and liquid/gas contactor
(9) connection to gas assembly
(10) Shurflow beverage pump
(11) beverage filter assembly
(12) liquid/gas contactor unit
(13) back check valve The arrangement shown in FIG. 5 is assembled such that the components may be placed in a basket assembly as indicated in FIG. 4 and placed within a refrigeration unit along with the beverage container (2).

Figure 7:
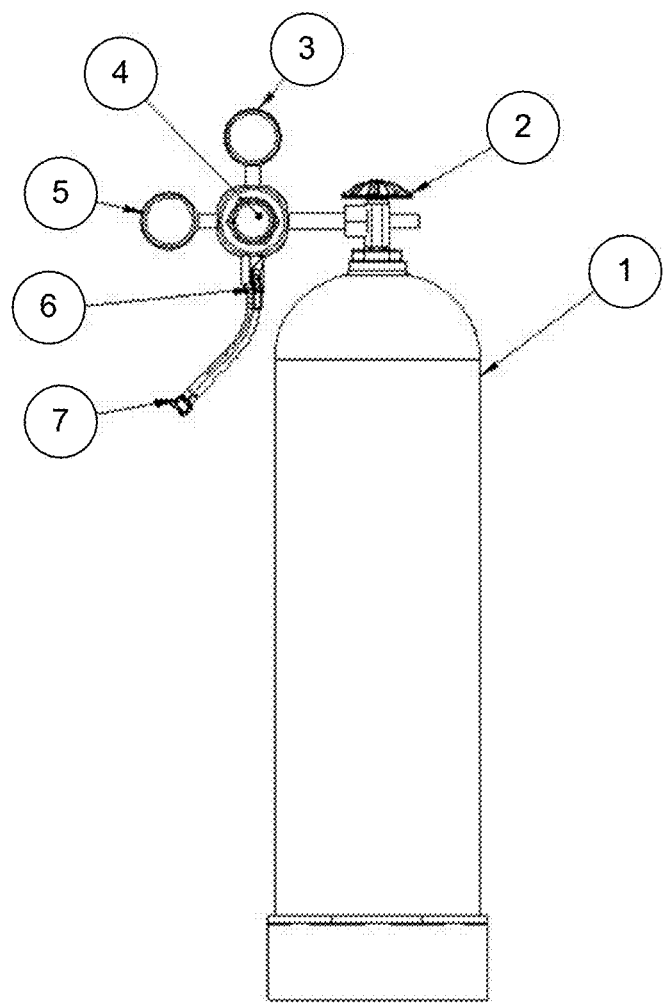
FIG. 7 shows a gas supply assembly suitable for use with the system of the present invention.

FIG. 7 shows a standard gas supply assembly that may be utilized with the dispense system of the present invention. The invention is not limited to the assembly of FIG. 7 and any pressure regulated supply system providing nitrogen or nitrogen mixed gas may be employed.

The component identification numbering for the gas supply system shown in FIG. 5 is identified according to the following key.

(1) $N_2$ or mixed gas tank
(2) tank open/close valve
(3) outlet pressure gauge
(4) regulator adjustment control
(5) gas volume gauge
(6) regulator valve
(7) gas quick connect coupling In another embodiment of the present invention the dispense unit as schematically shown in FIGS. 1 and 2 may be assembled in a unit suitable for mounting on a wall or a panel of a vehicle. The arrangement of the component parts may be vertical or horizontal and may have components on opposite sides of the wall or panel. For example, only the faucet tower may be visible on one side while the other functional components including the refrigeration unit, liquid/gas contactor, beverage container, pump and lines are out of view on the opposite side. The present invention includes all such arrangements as long as the schematic arrangement shown in FIGS. 1 and 2 and recited in the following Claims is present.

In another embodiment, the present invention provides a method for preparing and dispensing a chilled gas infused liquid from a system of the present invention. The method comprises charging a cooled beverage to the beverage tank; opening the regulator on the $N_2$ or $N_2/CO_2$ mixture supply to feed the gas to the liquid/gas contactor membrane unit, diaphragm pump and the secondary regulator; adjusting the supply regulator to supply $N_2$ or $N_2/CO_2$ at a pressure of from 20 to 70 psi at the liquid/gas contactor membrane unit and beverage pump; adjusting the secondary regulator to pressurize the beverage tank to 10-12 psi; pumping the chilled liquid from the beverage tank through the diaphragm pump to the liquid/gas contactor membrane unit; contacting the chilled liquid with $N_2$ or $N_2/CO_2$ in the liquid/gas contactor membrane unit to disperse and/or dissolve the $N_2$ or $N_2/CO_2$ in the liquid to obtain a $N_2$ or $N_2/CO_2$ infused liquid; and dispensing the $N_2$ or $N_2/CO_2$ infused liquid through the beverage faucet at a controlled rate to a receiver.

The method for dispensing from a bag-in-box container differs only in that there is no gas supplied to the bag-in-box container and no pressure applied to the bag-in-box container.

In one preferred embodiment the beverage is coffee that is cooled to a temperature of 30 to 40° F., preferably 32 to 38° F. and most preferably, 34 to 37° F. Further, when the beverage is coffee the $N_2$ pressure in the liquid/gas contactor membrane unit and at the beverage pump is from 20 to 70 psi and the $N_2$ content in the infused chilled coffee obtained is from 20 to 80 ppm, preferably 30 to 60 ppm and most preferable 40 to 50 ppm.

The effect of the slow dispensing of the slow pour faucet is such that upon release from the system and flow to the receiver such as a serving glass, $N_2$ gas escapes from the chilled coffee as it cascades to the glass and results in the appearance of a head of foam or froth on the surface of the chilled coffee providing a flavor, aroma and appearance unique to the product obtained according to the present invention.

The unique effect of the "head" obtained according to the invention may be attributable to the novel application of $N_2$ gas pressure applied in liquid/gas contactor membrane unit and the beverage pump. Although in one embodiment the beverage pump is a diaphragm pump driven by the $N_2$ or $N_2/CO_2$ mixture from the supply tank, it may be possible in other system embodiments to control the diaphragm pump by another method or gas supply independent of the $N_2$ or $N_2/CO_2$ mixture supply pressure.

Diaphragm pumps are conventionally employed in industry for the pumping of beer, soda and other beverages, especially because such pumps are compatible with carbonated as well as non-carbonated liquids. Although utility of a diaphragm pump has been disclosed in these embodiments, it may be possible to employ other pumps suitable for liquids intended for human consumption.

In an embodiment wherein the gas pressure to the diaphragm pump or other suitable beverage pump is independent of the $N_2$ or $N_2/CO_2$ supply pressure, the relative pressure of the $N_2$ or $N_2/CO_2$ gas in the liquid/gas contactor membrane unit and the pressure of the liquid in the liquid/gas contactor membrane unit may be varied in order to impart more unique appearance and possibly flavor enhancement to the dispensed chilled beverage. In this embodiment the ratio of the $N_2$ or $N_2/CO_2$ gas feed pressure to the liquid pressure of the chilled beverage in the liquid/gas contactor membrane unit may be from 20/1 to 1/20 in contrast to the embodiment described above wherein because the diaphragm pump and $N_2$ feed to the liquid/gas contactor membrane unit are from the same supply, the ratio of the $N_2$ gas feed pressure to the liquid pressure of the chilled beverage in the liquid/gas contactor membrane unit is approximately 1/1.

One of ordinary skill may learn the effect of variation of the ratio of the $N_2$ or $N_2/CO_2$ gas feed pressure to the liquid pressure of the chilled beverage in the liquid/gas contactor membrane unit on properties of the dispensed chilled beverage through experimentation and adjust the settings as learned to obtain a $N_2$ or $N_2/CO_2$ infused chilled beverage having unique flavor, aroma and appearance.

In a further embodiment, the system may further contain a blast chiller unit, wherein a hot liquid such as brewed coffee or tea is first rapidly chilled or superchilled to 40° F. or lower and then charged to the beverage tank. Such rapid chill may serve to further enhance the flavor and aroma of the $N_2$ or $N_2/CO_2$ infused chilled beverage when dispensed to a drinking glass or other receiver.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein. In this regard, certain embodiments within the invention may not show every benefit of the invention, considered broadly.

The invention claimed is:

1. A system for dispensing a cooled beverage, comprising:
   a liquid/gas contactor unit;
   a beverage pump;
   a beverage tank in liquid communication with the liquid/gas contactor unit through the beverage pump, wherein the beverage tank is pressurized;
   a cooling or refrigeration system configured to cool the beverage tank, wherein the beverage pump is configured to transfer a cooled noncarbonated beverage from the beverage tank to the liquid/gas contactor unit;
   a controlled pressurized supply of a regulated pressure nitrogen gas comprising at least 50% by weight nitrogen ($N_2$);
   one or more secondary regulators for feeding the regulated pressure nitrogen gas to the liquid/gas contactor unit and the beverage pump, wherein the cooled noncarbonated beverage contacts the regulated pressure nitrogen gas in the liquid/gas contactor unit to dissolve the regulated pressure nitrogen gas in the cooled noncarbonated beverage to form a cooled nitrogen-infused noncarbonated beverage; and
   a beverage faucet attached downstream to the liquid/gas contactor unit configured to dispense the cooled nitrogen-infused noncarbonated beverage at a controlled rate.

2. The system for dispensing a cooled liquid of claim 1, wherein the beverage faucet is a slow pour faucet optionally fitted with a restrictor nozzle or restrictor plate that allows for release of $N_2$ or $N_2/CO_2$ gas from the cooled beverage when dispensed to a receiver.

3. The system for dispensing a cooled liquid of claim 1, wherein the regulated pressure nitrogen gas is a pure nitrogen gas having at least 99.5% $N_2$.

4. The system for dispensing a cooled liquid of claim 1, wherein a pressure applied to the beverage tank is from 10 to 12 psi.

5. The system for dispensing a cooled liquid of claim 1, wherein the cooling or refrigeration system configured to cool the beverage tank to a temperature of from 30 to 40° F.

6. The system for dispensing a cooled liquid of claim 1, wherein a pressure of the regulated pressure nitrogen gas supplied to the liquid/gas contactor unit and the beverage pump is simultaneously controlled at from 20 to 70 psi.

7. A beverage dispensing unit comprising the system for dispensing a cooled liquid of claim 1 and the cooling or refrigeration system in one self-contained unit, and further comprising a blast chiller before the beverage tank within the self-contained unit or external to the self-contained unit.

8. A beverage dispensing unit comprising the system for dispensing a cooled liquid of claim 1 and the cooling or refrigeration system in one self-contained unit, and further comprising an inline strainer and/or filtration unit in the beverage pump prior to the liquid/gas contactor unit.

9. A dispense kit, comprising at least the system of claim 1 in a self-contained unit capable of being affixed to a wall or a panel.

10. A system for dispensing a cooled beverage, comprising:
    a liquid/gas contactor unit;
    a beverage pump;
    a bag-in-box beverage container in liquid communication with the liquid/gas contactor unit through the beverage pump, wherein the beverage pump is configured to transfer a noncarbonated beverage from the bag-in-box beverage container to the liquid/gas contactor unit;
    a cooling or refrigeration system configured to cool the bag-in-box beverage container;
    a controlled pressurized supply of a regulated pressure nitrogen gas comprising at least 50% by weight nitrogen ($N_2$);
    one or more secondary regulators for feeding the regulated pressure nitrogen gas to the liquid/gas contactor unit and the beverage pump, wherein the noncarbonated beverage contacts the regulated pressure nitrogen gas in the liquid/gas contactor unit to dissolve the regulated pressure nitrogen gas in the noncarbonated beverage to form a cooled nitrogen-infused noncarbonated beverage; and
    a beverage faucet attached downstream to the liquid/gas contactor unit configured to dispense the cooled nitrogen-infused noncarbonated beverage at a controlled rate.

11. The system for dispensing a cooled liquid of claim 10, wherein the beverage faucet is a slow pour faucet optionally fitted with a restrictor nozzle or restrictor plate that allows for release of $N_2$ or $N_2/CO_2$ gas from the beverage when dispensed to a receiver.

12. The system for dispensing a cooled liquid of claim 10, wherein the regulated pressure nitrogen gas is a pure nitrogen gas having at least 99.5% $N_2$.

13. The system for dispensing a cooled liquid of claim 10, wherein no pressure is applied to the bag-in-box beverage container.

14. The system for dispensing a cooled liquid of claim 10, wherein the cooling or refrigeration system configured to cool the bag-in-box beverage container to a temperature of from 30 to 40° F.

15. The system for dispensing a cooled liquid of claim 10, wherein a pressure of the regulated pressure nitrogen gas supplied to the liquid/gas contactor unit and the beverage pump is simultaneously controlled at from 20 to 70 psi.

16. A beverage dispensing unit comprising the system for dispensing a cooled liquid of claim 10 and the cooling or refrigeration system in one self-contained unit, and further comprising a blast chiller before the bag-in-box beverage container within the self-contained unit or external to the self-contained unit.

17. A beverage dispensing unit comprising the system for dispensing a cooled liquid of claim 10 and the cooling or refrigeration system in one self-contained unit, and further comprising an inline strainer and/or filtration unit in the beverage pump prior to the liquid/gas contactor unit.

18. A dispense kit, comprising at least the system of claim 10 in a self-contained unit capable of being affixed to a wall or a panel.

19. A kit, comprising:
   a liquid-gas contactor having a downstream line with a liquid connect for connection to a tower assembly;
   a liquid supply line upstream to the liquid-gas contactor comprising a beverage pump, a beverage filter assembly, and a connect coupling;
   a gas supply line upstream to the liquid-gas contactor and the beverage pump having a gas regulator and a gas connect coupling;
   wherein
   a safety gas regulator is located in the gas supply line between the gas regulator and the liquid-gas contactor, and
   a back check valve is located in the downstream line of the liquid-gas contactor prior to the tower assembly.

20. The kit of claim 19, further comprising a secondary gas regulator between the gas regulator and the safety gas regulator.

21. The kit of claim 19, further comprising a purge and clean valve in the liquid supply line.

\* \* \* \* \*